UNITED STATES PATENT OFFICE.

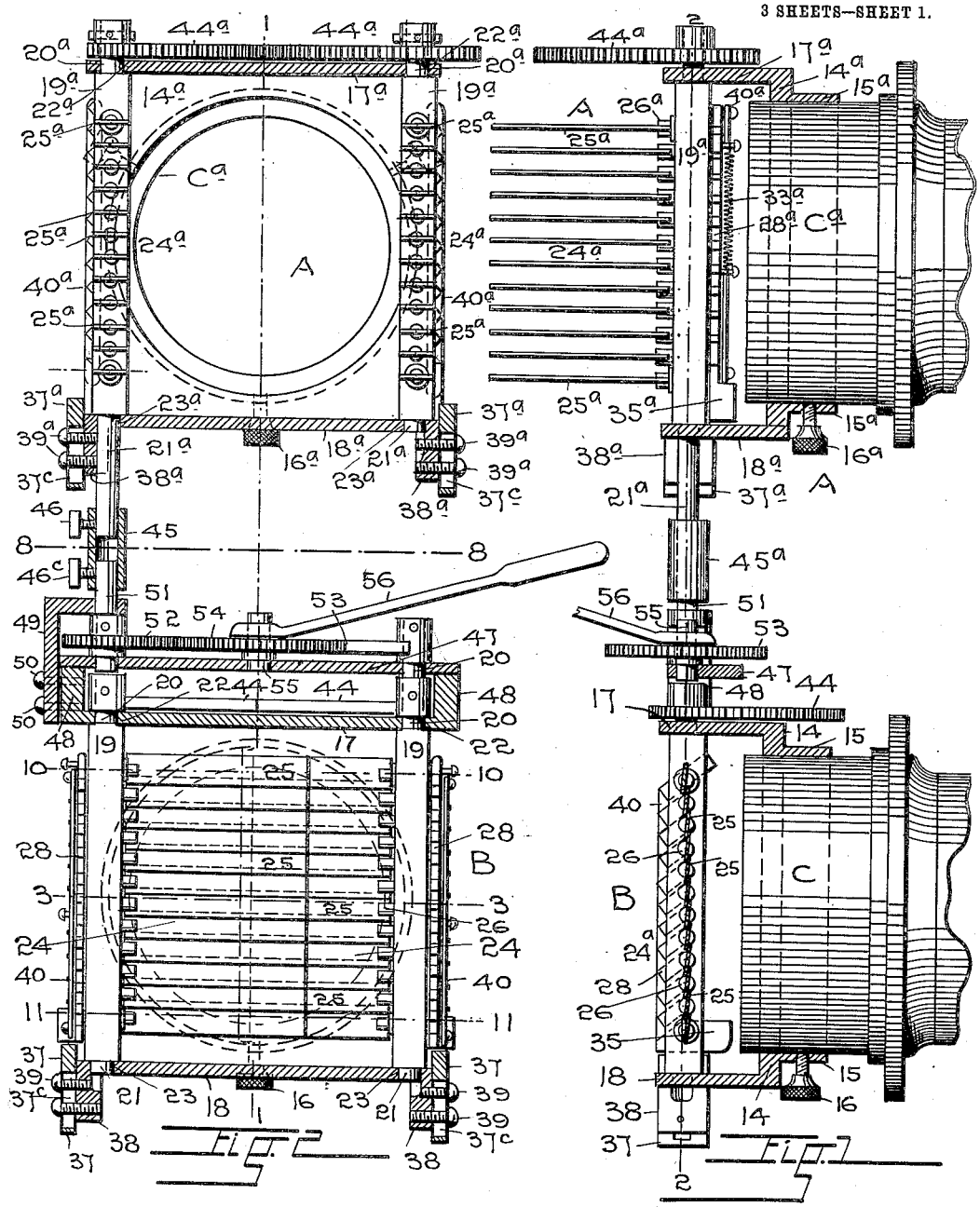

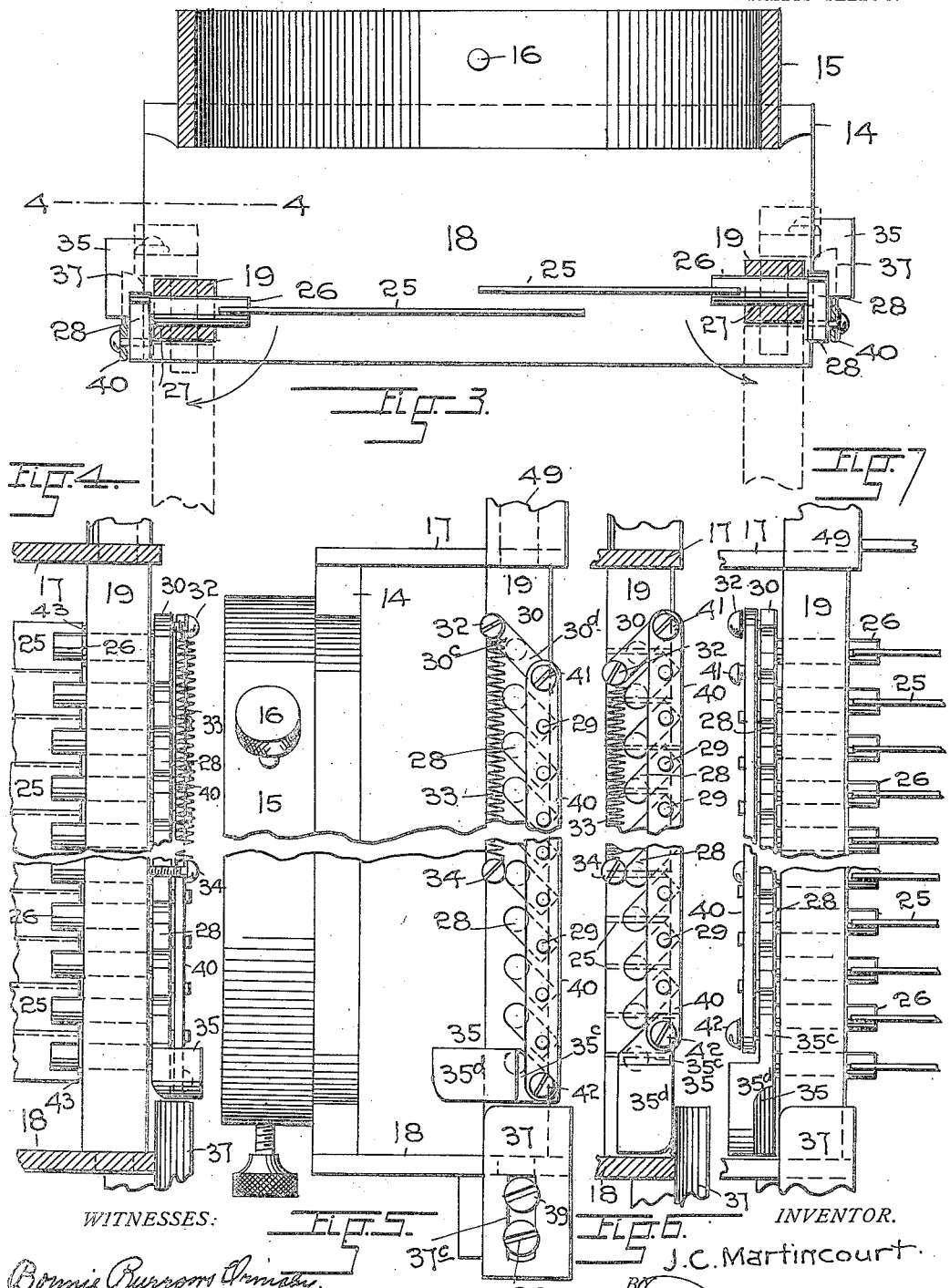

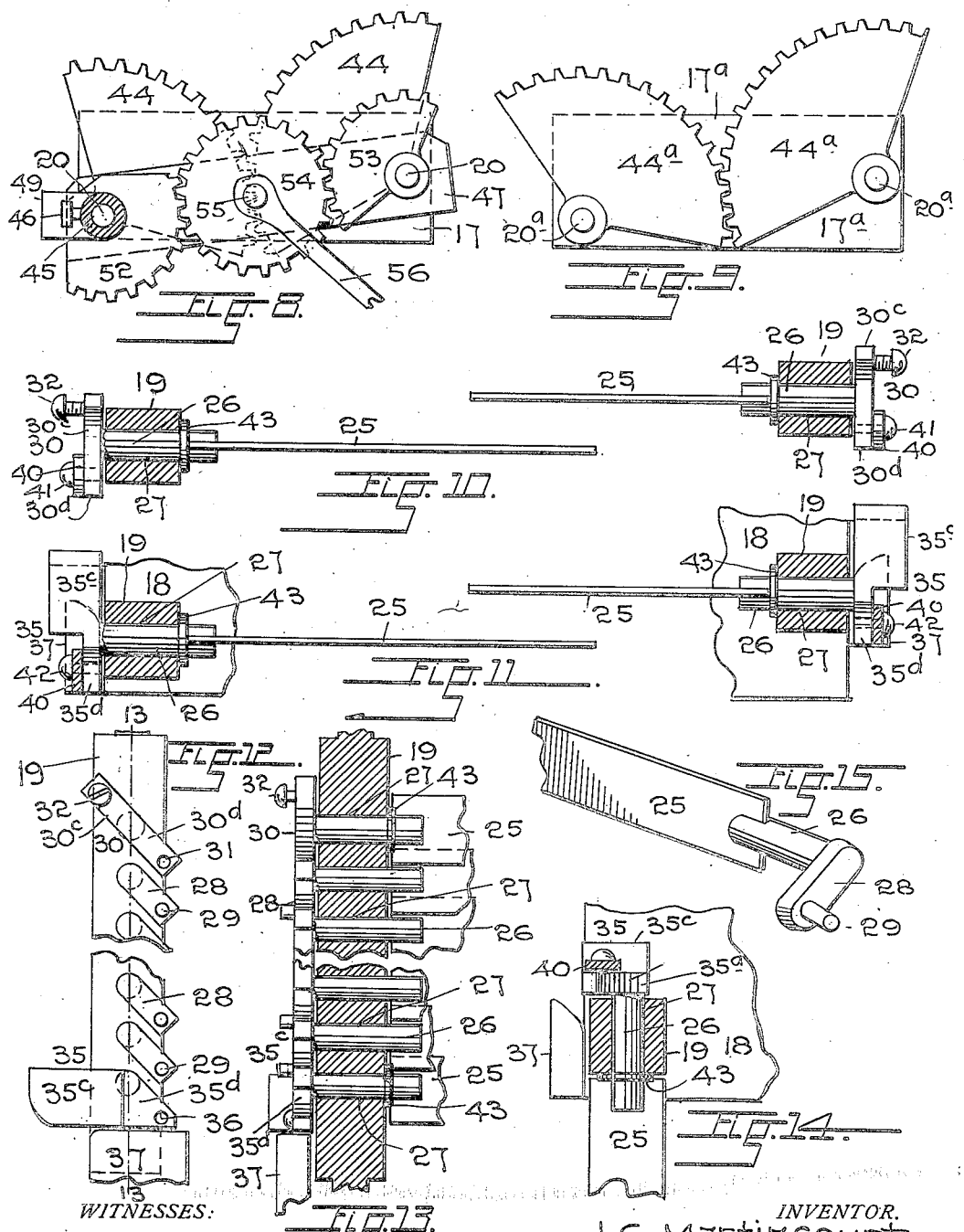

JOHN C. MARTINCOURT, OF DENVER, COLORADO.

DISSOLVING MECHANISM FOR STEREOPTICONS.

No. 837,942.              Specification of Letters Patent.              Patented Dec. 11, 1906.

Application filed February 8, 1906. Serial No. 300,083.

*To all whom it may concern:*

Be it known that I, JOHN C. MARTINCOURT, a citizen of the United States of America, residing at Denver, in the county of Denver and State of Colorado, have invented certain new and useful Improvements in Dissolving Mechanism for Stereopticons, of which the following is a specification.

My invention relates to a dissolving mechanism for use on stereopticons, and has for its object the production of a simple mechanical device which may readily be attached to any stereopticon irrespective of its size or construction and through instrumentality of which the finest dissolving effects may be obtained by causing a view projected on a curtain to gradually fade away while another one simultaneously takes its place and gradually grows brighter. I attain these objects by the mechanism illustrated in the accompanying drawings, in the various views of which like parts are similarly designated, and in which—

Figure 1 represents a vertical section 25 through the device, taken along a line 1 1, Fig. 2, as mounted on the objective lenses of a double or so-called "dissolving" stereopticon; Fig. 2, a vertical section taken along a line 2 2, Fig. 1; Fig. 3, an enlarged cross-section 30 taken along the line 3 3, Fig. 2; Fig. 4, an enlarged fragmentary vertical section of one of the members of the device, taken along a line 4 4, Fig. 3; Fig. 5, an enlarged fragmentary side view of one of the members with the shutters in the closed position; Fig. 6, a vertical section taken along the same line as the section shown in Fig. 4 while the shutters are in the open position; Fig. 7, a fragmentary side view similar to that shown in Fig. 4 while the shutters are in the open position; Fig. 8, a horizontal section taken along a line 8 8, Fig. 2, looking downward; Fig. 9, a top view of the upper member of the device; Fig. 10, an enlarged cross-section taken along the line 10 10, Fig. 2; Fig. 11, a similar section taken along a line 11 11, Fig. 2; Fig. 12, an enlarged fragmentary side elevation of one of the members, the connecting-bar and the spring being omitted; Fig. 13, a vertical section taken along a line 13 13, Fig. 12; Fig. 14, a fragmentary cross-section taken along the same line as the one illustrated in Fig. 11, the shutters being in the open position; and Fig. 15, a fragmentary perspective end view of one of the slats of which the shutters are composed.

The device as shown in Figs. 1 and 2 is composed of two superposed identical members A and B, designed for use on a double or dissolving stereopticon, the objective lenses of which are designated by the reference characters C and C$^a$.

The double dissolver being the one most commonly used, I have limited my description to this form. It should be understood, however, that by disconnecting the members either of them may be used to advantage in connection with a single stereopticon, while when it is desired to employ a dissolver on a stereopticon having three or more lenses additional members identical to the upper one shown in the drawings may be connected to operate in unison with the other members without material change in the construction or arrangement of their parts.

Members A and B being identical in construction, size, and operation, but one of them need be described, the parts of the upper member having been distinguished from the corresponding parts on the lower member by the exponent "a" added to the reference characters employed to designate them in the drawings and specification.

Each member consists of a rectangular frame 14, supporting a concentrically-disposed integral ring 15, which in practice encircles the objective lens-tube of the stereopticon and on which it is adjustably held by means of a plurality of clamp-screws 16. Frame 14 is furthermore provided with two forwardly-projecting platforms 17 and 18, extending in parallel relation from its upper and lower edges and which support the shutters and operating mechanism, as will now be described. In connection I wish to state that although the mode of attaching the members to the stereopticon-lenses as shown and described is preferable on account of its simplicity I do not wish to limit myself to its use, as different attaching means may be substituted without altering the construction or operation of the more essential parts of my device. It will furthermore be seen that my invention may be employed with equal results if placed between the objective and condensing lenses instead of in front of the former, as illustrated in the drawings.

Disposed at opposite sides and in front of frame 14 are the preferably quadrilateral upright shafts 19, the reduced cylindrical extensions 20 and 21 of which project through oppositely-located apertures 22 and 23 in the platforms 17 and 18, between which the angular portions of the shafts extend. Shafts 19 support the normally inwardly extending shutters or light-shields 24, which consist of a plurality of normally overlapping pivotally-arranged thin slats 25, made of steel or other suitable material. The ends of slats 25 adjacent to the shafts are rigidly secured in the protruding extremities of horizontally-arranged crank-spindles 26, which extend, respectively, through a series of transverse bores 27 in the shafts 19. The opposite outer extremities of the crank-spindles, excepting the upper and lower ones, are provided with the preferebly integral crank-arms 28, which have outwardly-extending wrists 29. On each shaft the spindle 26, to which the uppermost slat is connected, is provided with a double crank 30, extending in opposite directions from the spindle's extremity. One arm 30$^d$ of the said crank has a threaded aperture 31, while the opposite arm 30$^c$ has a pin 32, to which in practice is secured the upper extremity of a coiled spring 33, the lowermost end of which is fastened to the corresponding shaft 19 by means of a pin 34.

The outer extremity of the spindle 26, which supports the lowermost slat, is provided with a lever 35, having two oppositely-extending arms 35$^d$ and 35$^c$, the former of which is provided at its outer extremity with a threaded aperture 36, similar to the one in arm 30$^d$ of the double crank 30. The opposite arm 35$^c$ of lever 35 being heavier than arm 35$^d$ engages the upper edge of a stationary slotted block 37, which is vertically adjustably secured to a downwardly-extending integral lug 38 on platform 18 by means of screws 39, extending through a slot 37$^c$ in the block and into correspondingly-threaded apertures in lug 38.

When the slats 25 composing shutters 24 are in operative or parallel position, the crank-arms 28 are likewise parallel to each other and to the double crank 30, while wrists 29 and apertures 31 and 36 are vertically alined. When in this position, arms 28, 30, and 35 are connected by a vertically-extending connecting-bar 40, having a series of openings through which the wrist-pins 29 project, while its opposite extremities are provided with apertures for the reception of screws 41 and 42, respectively secured in the correspondingly-threaded apertures 31 and 36 in arm 30$^d$ of crank 30 and arm 35$^d$ of lever 35.

To keep the inner extremities of slats 25 from contact with the adjacent side of shaft 19, the upper and lower spindles 26 have been provided with fixed washers 43, which engage the shaft 19.

In the foregoing description the construction and mechanical arrangement of but one shutter has been described, the two opposite shutters on each member of the device being duplicates of each other.

When the shutters or light-shields are in the closed positions, (see Figs. 3, 10, and 11,) the extremities of slats 25 extending beyond the vertical center line of frame 14 overlap each other, thereby forming an effectual obstruction to the rays of light.

By rotating shafts 19 in the direction of the arrows in Fig. 3 the shutters diverge until they have reached the parallel position illustrated in broken lines in the same figure, when the rays of light may pass unobstructed onto the curtain upon which the pictures are produced.

To insure simultaneous opening and closing of the shutters of each member, the upwardly-extending extremities 20 of shafts 19 are provided with segmental gear-wheels 44, the teeth of which mesh into each other. It will thus be observed that when but one of the members is used on a single stereopticon the dissolver may be operated by rotating one of the shafts 19, which may be accomplished by means of a wrench, lever, or other convenient means.

When the two members A and B are used in connection on a double stereopticon, as shown in Figs. 1 and 2, the shutters on one of them must be open while the ones on the other are closed, and vice versa, for the purpose of causing the picture projected by one of the lenses on the curtain to gradually fade away while that produced by the other appears by degrees. To accomplish this object in one operation, I extend the extremity 21$^a$ of one of the shafts 19$^a$ of member A to within a short distance of the extremity 20 of the corresponding shaft 19 on the lower member. Member B has to this end been provided with a bearing-plate 47, elevated above platform 17 and held in parallel relation thereto on integral ridges 48, and, furthermore, with an additional bearing-lug 49, extending above plate 47 and secured to one of the ridges 48 by screws 50.

To accommodate the device to the varying distances between the lenses of double stereopticons, the extension of the extremity 21$^a$ of shaft 19$^a$ is made to be vertically adjustable by means of a sleeve 45, secured to the lower end of extremity 21$^a$ by a set-screw 46 and holding in its lower orifice a short rod 51, secured therein by a second set-screw 46$^c$. This rod 51 extends through vertically-alined corresponding apertures in the bearing-lug 49 and plate 47, intermediate of which it is provided with a segmental gear 52. A second identical gear 53 is secured to the upper extremity 20 of the opposite shaft 19 of member A and is in horizontal alinement with the one on rod 51, while an intermediate gear-wheel 54, located between and in mesh with segment-gears 52 and 53, is adapted to impart a simultaneous rotary movement thereto. Gear 54 is rotatably mounted on plate 47 by means of a short spindle 55 and is provided with an upwardly and outwardly ranging operating-handle 56.

Having thus described the mechanical construction of the dissolver, its operation is as follows: Members A and B, having been connected as previously described, are secured to the lenses of the stereopticon by means of clamp-screws 16. Before the set-screws 46 and 46° in sleeve 45 are tightened the shutters on the two members are adjusted so that those in one of them are in the open position while those in the other are closed. The device is now ready for operation. In Figs. 1 and 2 of the drawings the shutters in member A are open, while those in the lower member B are closed. The upper lens C$^a$ therefore projects the picture placed between it and the light in the stereopticon upon the curtain, while the passage of the light from the lower lens is obstructed. Desiring to produce the picture placed behind the lower lens in place of the one on the curtain, the operator slowly turns handle 56 in the required direction and through instrumentality of gears 54, 53, and 44 causes the shutters on the lower member to diverge, while those on the upper member simultaneously close by action of gears 54, 52, and 44$^a$. While the light-shields are in the closed position and slats 25 overlap one another levers 35 extend in horizontal direction at right angles to the connecting-bars 40 above blocks 37, while springs 33, being expanded, are under tension. (See Figs. 4 and 5.) As soon as shafts 19 are being rotated for the purpose of opening the shutters the fulcrum of lever 35 is brought nearer the edge of block 37 and its arm 35$^d$, which by contact with the upper edge of said block retained spring 33 in expanded condition, moves away from its support, allowing the spring to gradually contract until the shafts have described an angle of ninety degrees, when the shutters are in the open position and lever 35 has assumed a vertical position parallel to block 37 and in alinement with connecting-bar 40. (See Figs. 6 and 7.) The contraction of spring 33 at the same time has caused arm 30° of crank 30 to move downward, resulting in the upward movement of the opposite arm 30$^d$ and the therewith-connected bar 40, which being pivotally connected with crank-arms 28 causes partial rotation of the crank-spindles and the thereto-attached shutter-slats. The consequence is that while shafts 19 are being rotated and the shutters diverge the slats, which while the shutters were closed overlapped one another, gradually separate until shafts 19 have described an arc of ninety degrees and the shutters are open, at which time they are in parallel relation to each other.

It will thus be observed that when the shutters are opened the light, which while they were closed was obstructed, is not only permitted to pass between the slowly-diverging shutters, but may also find its way in between the gradually-separating slats, while when the shutters are closed the light is intercepted in the same ratio, thus producing a most perfect dissolving effect, which, as stated, lies in the gradually-fading away of the one view and the slowly coming out of another.

Having thus described my invention, what I claim is—

1. A dissolving mechanism for stereopticons comprising in combination with a stereopticon a plurality of slats arranged to coöperatively intercept the light passing through the lens of the stereopticon and means to separate the slats and move them out of the path of the light.

2. A dissolving mechanism for stereopticons, comprising a frame, shutters composed of a plurality of slats, pivotally mounted thereon at their opposite outer extremities, and means to cause the inner extremities of said shutters to diverge, and means to simultaneously separate the slats.

3. A dissolving mechanism for stereopticons, comprising a frame, shafts oppositely mounted thereon, light-shields composed of a plurality of overlapping slats, extending inwardly from said shafts, and means to simultaneously rotate the shafts in opposite directions, and to separate the slats.

4. A dissolving mechanism for stereopticons, comprising a frame, opposite shafts oppositely mounted thereon, light-shields composed of a plurality of overlapping slats, extending inwardly from said shafts, and means to simultaneously rotate the shafts in opposite directions and to partially revolve the slats.

5. A dissolving mechanism for stereopticons, comprising a frame, shafts oppositely mounted thereon, a plurality of spindles mounted transversely on said shafts, overlapping slats extending inwardly from the extremities of said spindles, means to simultaneously rotate the shafts in opposite directions, and means to rotate the spindles during movement of the shafts.

6. A dissolving mechanism for stereopticons, comprising a frame, shafts oppositely mounted thereon, a plurality of connected crank-arms, having spindles extending transversely through said shafts, normally overlapping slats extending from the extremities of the spindles, the slats on one shaft normally overlapping those on the other, means to simultaneously rotate the shafts and means to turn the crank-spindles during movement of the shafts.

7. A dissolving mechanism for stereopticons, comprising a frame, shafts oppositely mounted thereon, a plurality of crank-arms having spindles extending transversely through the shafts, normally overlapping slats extending inwardly from the extremities of the spindles, bars connecting the crank-arms on each shaft, tension-springs adapted to impart a partial rotary movement to the connected crank-arms, levers on said bars engaging projections on the frame to retain the connected crank-arms while the springs are under tension, and means to simultaneously rotate the shafts in opposite directions, said levers and projections being arranged to disengage and permit contraction of the springs during movement of the shafts.

8. A dissolving mechanism for stereopticons, having two superposed members, each comprising pivotally and oppositely mounted light-shields and means to simultaneously rotate the shields of each member in opposite directions from each other and from the corresponding shields on the other member.

9. A dissolving mechanism for stereopticons, comprising two superposed vertically adjustably connected members, oppositely-mounted shafts on each member, light-shields extending from said shafts, those on one member extending inwardly and overlapping one another, while those on the other extend outwardly at right angles to the first-named shields, and means to simultaneously reverse the positions of said shields by rotation of the shafts.

10. A dissolving mechanism for stereopticons, comprising two superposed members, oppositely-mounted shafts having meshing gear-wheels, on each member, light-shields extending laterally from said shafts, those on one member being at right angles to those on the other, gear-wheels mounted respectively on one shaft of each member and a driving-gear engaging said wheels.

In testimony whereof I have affixed my signature in presence of two witnesses.

JOHN C. MARTINCOURT.

Witnesses:
G. J. ROLLANDET,
R. M. C. STUMP.